(12) United States Patent
Hamada

(10) Patent No.: US 8,250,868 B2
(45) Date of Patent: Aug. 28, 2012

(54) VARIABLE GEOMETRY TURBINE HAVING INTERMESHING CONTROL AND GUIDE BLADES

(75) Inventor: Raed Hamada, Stuttgart (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 737 days.

(21) Appl. No.: 12/411,971

(22) Filed: Mar. 26, 2009

(65) Prior Publication Data

US 2009/0249784 A1 Oct. 8, 2009

(30) Foreign Application Priority Data

Mar. 27, 2008 (DE) .......................... 10 2008 000 847

(51) Int. Cl.
*F02G 3/00* (2006.01)
(52) U.S. Cl. ............................. 60/615; 60/602; 60/614
(58) Field of Classification Search ...................... 60/600, 60/602, 614, 615; 415/167
See application file for complete search history.

(56) References Cited

U.S. PATENT DOCUMENTS

| | | | | |
|---|---|---|---|---|
| 2,996,996 A | * | 8/1961 | Jassniker | 415/126 |
| 4,586,336 A | * | 5/1986 | Horler | 60/602 |
| 4,776,168 A | * | 10/1988 | Woollenweber | 60/602 |
| 5,214,920 A | * | 6/1993 | Leavesley | 60/602 |
| 2007/0227603 A1 | * | 10/2007 | Perrin et al. | 138/43 |

* cited by examiner

*Primary Examiner* — Quyen Leung
*Assistant Examiner* — Michael Andrews
(74) *Attorney, Agent, or Firm* — Rader, Fishman & Grauer PLLC

(57) ABSTRACT

The invention relates to a variable turbine geometry (28) of an exhaust gas turbocharger (2) of a motor vehicle, with a fixed guide blade ring (20) and an axially moveable control blade ring (15), wherein an axial relative position of guide blades (21) of the guide blade ring (20) to control blades (15) of the control blade ring (13) defines the size of inflow cross sections to a turbine wheel (11) of the exhaust gas turbocharger (2), and wherein the guide blades (21) and the control blades (15) extend in directions opposite to each other as far as to their respective free ends (18) and the control blades (15) are arranged on a cross carrier of the control blade ring (13), which as a function of the axial relative position opens, partially opens or closes additional inflow paths (29) for the enlargement or the reduction of the inflow cross sections.

Furthermore, an exhaust gas turbocharger (2) with such a variable turbine geometry (28) as well as a method for the control of the inflow of an exhaust gas turbine with such a variable turbine geometry is proposed.

8 Claims, 6 Drawing Sheets

Fig. 2.1
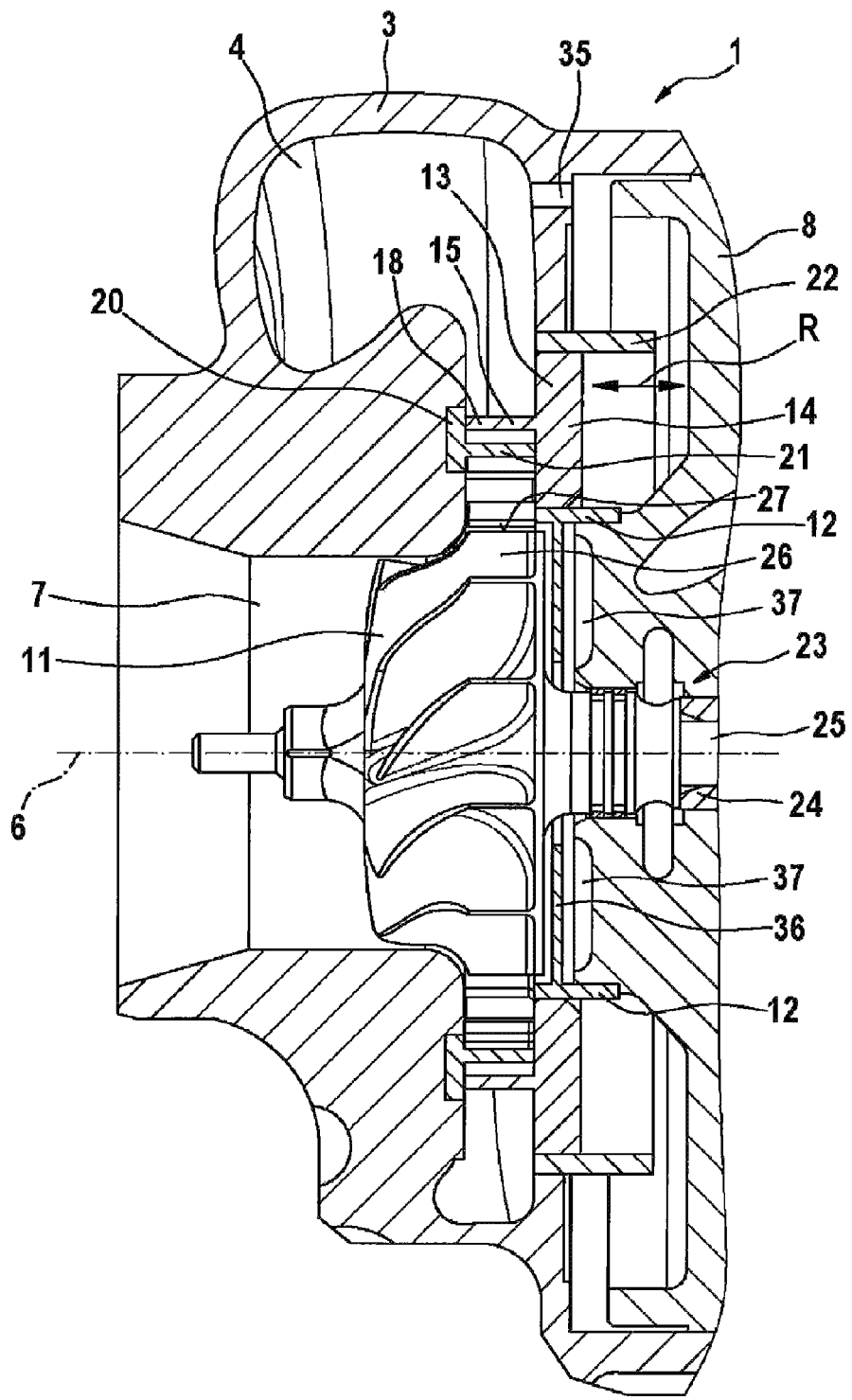

Fig. 2.2
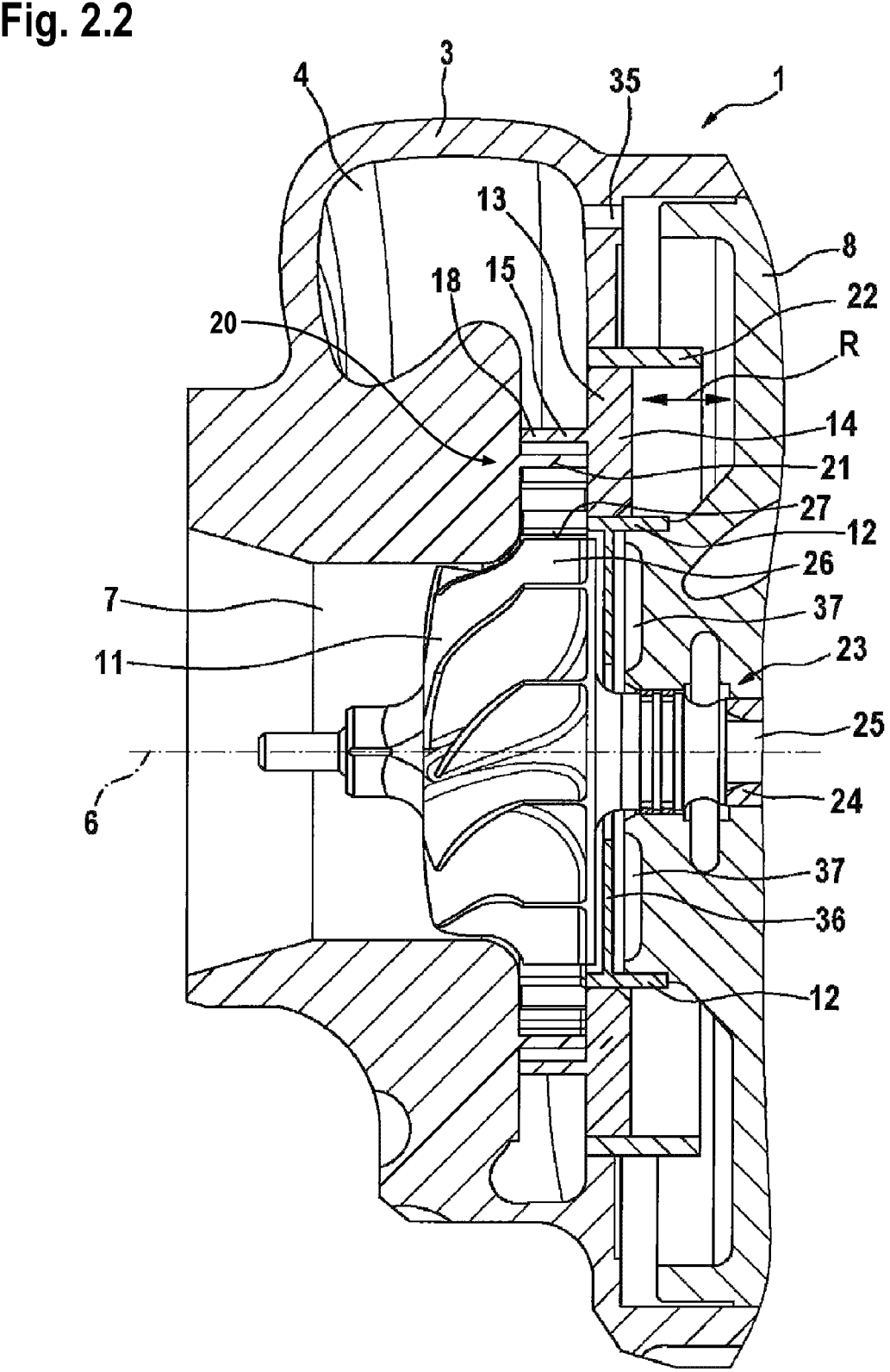

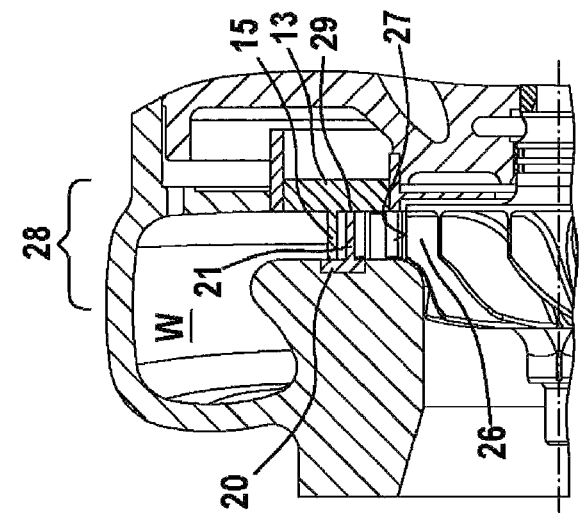
Fig. 3.1
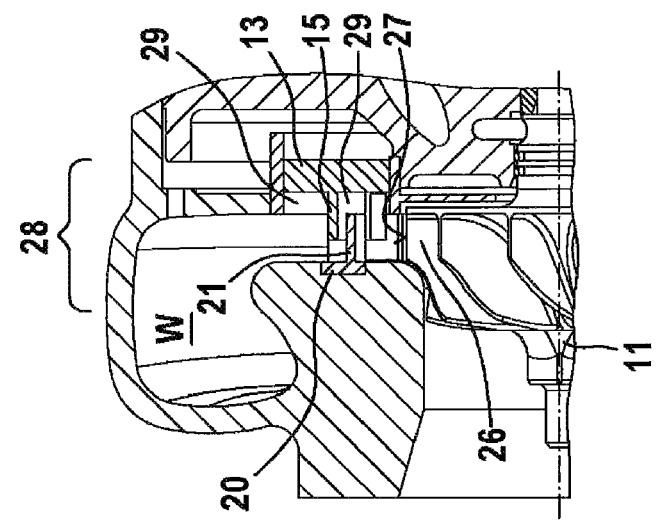
Fig. 3.2
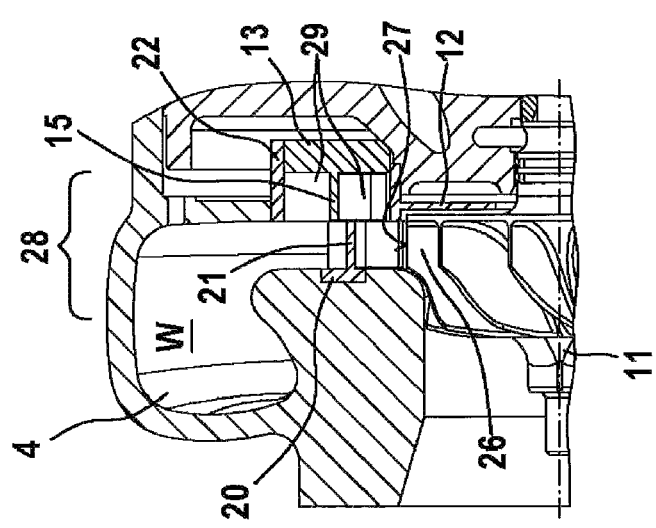
Fig. 3.3

VARIABLE GEOMETRY TURBINE HAVING INTERMESHING CONTROL AND GUIDE BLADES

CROSS-REFERENCES TO RELATED APPLICATION

This application claims priority to German patent application DE 10 2008 000 847.8 filed on Mar. 27, 2008, which is hereby incorporated by reference in its entirety.

TECHNICAL FIELD

The invention relates to a variable turbine geometry of an exhaust gas turbocharger of a motor vehicle.

PRIOR ART

Variable turbine geometries of exhaust gas turbochargers for motor vehicles are known. They serve to expand the operating range of the exhaust gas turbocharger and provide turbocharger charges in as wide as possible an operating range of the combustion engine and the exhaust gas turbocharger. A multiplicity of variable turbine geometries are known wherein as a function of certain operating points the inflow of the turbine wheel of the exhaust gas turbocharger is varied. This is done for example by changing the exhaust gas volumetric flow by changing the direction of the exhaust gas volumetric flow or by changing over from radial to diagonal admission.

From U.S. Pat. No. 4,586,336 an exhaust gas turbocharger is known which varies the admission to the turbine wheel of the exhaust gas volumetric flow in that, via an axially displaceable slide ring, it opens up or closes a larger or smaller passage cross section for the exhaust gas volumetric flow to the blades of the turbine wheel. The disadvantage here is that although the volumetric flow is at least partially shut off in the desired manner, the inflow to the turbine wheel however is changed at the same time and the direction and area of the loading of the blades of the turbine wheel are changed in an undesirable manner, depending on the position of the slide ring. As a result, the speed of the turbine wheel and more preferably its acceleration capability is impaired in an undesirable manner.

The object of the invention is to provide a variable turbine geometry of an exhaust gas turbocharger which avoids the mentioned disadvantages and has high efficiency and more preferably a very high run-up capability over a very wide operating range.

DISCLOSURE OF THE INVENTION

To this end a variable turbine geometry of an exhaust gas turbocharger of a motor vehicle is proposed which has a fixed guide blade ring and an axially movable control blade ring. An axial relative position of guide blades of the guide blade ring to the control blades of the control blade ring in this case defines the magnitude of inflow cross sections to a turbine wheel of the exhaust gas turbocharger, wherein the guide blades and the control blades extend as far as to their respective free ends in opposite directions to one another and the control blades are arranged on a cross carrier of the control blade ring which as a function of the axial relative position opens at, partially opens or closes additional inflow paths to enlarge or reduce the inflow cross sections. Guide blades and control blades are arranged opposite one another and extend as far as to their respective free ends. The control blades are arranged on a cross carrier of the control blade ring which, depending on its axial relative position to the guide blade ring, opens or closes additional inflow paths. Through this the exhaust gas cross section can be varied, i.e. the cross section in which the exhaust gas volumetric flow passes through the guide blade ring-control blade ring geometry and which finally is effective through energy output to the turbine wheel. The additional inflow path in this case do not relate to the guiding of the exhaust gas directly on to the turbine wheel, but the inflow of the exhaust gas volumetric flow to the region of the guide blades and control blades. Through this it can be ensured that in the outer region of the guide blade/control blade geometry (i.e. outside the immediate turbine wheel surroundings) sufficient exhaust gas volumetric flow is always available in order to achieve kinetically effective loading of the turbine wheel in the desired case.

In a further embodiment it is provided that control blades and guide blades intermesh comb-like to a greater or lesser extent as a function of their axial relative position. The control blades and guide blades located opposite one another intermesh their geometries comb-like so to speak in such a manner that their free ends in each case reach as far as into the region of the carrier of the respective opposite geometry. For example a fixed guide blade in the state of intermeshing of control blades and guide blades can advance as far as into the region of the cross carrier of the control blade ring or come to bear on said ring. A highly effective volume adjustment with high mechanical stability can be brought about through this.

In another embodiment the control blade ring has depressions in which the guide blades of the guide blade ring engage to a greater or lesser extent as a function of the axial relative position. The fixed guide blades of the guide blade ring consequently advance into the geometry of the control blade ring, namely in depressions which are provided in the control blade ring, preferably at the face end of the control blades. To this end, the control blades are embodied for example wing profile-like, wherein in their middle region they comprise depressions in which the guide blades engage.

Furthermore it is provided that the turbine wheel comprises turbine blades with a delivery edge each, wherein the delivery edge is subjected to inflow via an axial cross section that remains the same independent of the relative position of guide blades and control blades. A substantial disadvantage of the prior art is that the inflow on to the delivery edge changes as a function of the relative position of guide blades and/or control blades and/or other guide elements. Consequently not only a change of the volumetric flow of the inflowing exhaust gas is carried out but also a change of the inflow geometry on to the turbine blades. For example in the quoted U.S. Pat. No. 4,586,336 an inflow is present which loads only a small region of the delivery edge of each turbine blade when the slide ring is substantially closed and loads a large region of the delivery edge when the slide ring is opened. In contrast, according to the invention the delivery edges are always loaded identically, regardless of the position of the control blade ring relative to the guide blade ring. This is achieved in that the exhaust gas volumetric flow is varied through the additional inflow paths for the enlargement or the reduction of the inflow cross section, but through the tooth or comb-like intermeshing of control blades and guide blades the delivery edge is ultimately loaded identically. More details are shown in the Figures. Through this it is ensured that the turbine wheel can run up very rapidly when power is demanded since a favourable inflow takes place via the full delivery edge at every stage of its operation. A highly effective and spontaneous operation of the combustion engine without noticeable delays in the charge pressure build-up is achieved through this.

In a further preferred embodiment the cross carrier has a ring structure in which a ring channel of a housing of the exhaust gas turbocharger is mounted in an axially displaceable manner. The cross carrier on which the control blades are arranged and which for their adjustment or setting of the axial relative position of the control blade ring to the guide blade ring is axially moveable consequently has a ring structure, preferably one such which surrounds the circumference of the turbine wheel. The ring structure is mounted axially displaceably in a ring channel which is associated with the housing of the exhaust gas turbocharger or arranged in the latter. Through the axial displacement of the ring structure in the ring channel a precise and rapid setting of the control blade ring relative to the guide blade ring can be achieved with simple control mechanics.

In a further preferred embodiment the guide blade ring at least in sections is embodied as one piece with the turbine housing. The guide blade ring is consequently a part of the turbine housing and manufactured of the same material as the turbine housing. Here it is possible to embody the guide blade ring entirely as one piece with the turbine housing, i.e. in such a manner that the guide blades project directly out of the turbine housing or in sections, i.e. in such a manner that the guide blades in sections are embodied on the turbine housing and in sections on a guide blade ring section separate thereto. More preferably with entirely one-piece embodiment very simple and cost-effective manufacture is possible.

Furthermore an exhaust gas turbocharger with a variable turbine geometry is proposed which comprises the features described above. In principle it is also possible here to reverse the mode of operation in such a manner that in the previous control blade ring position the guide blade ring is arranged and vice versa.

Furthermore a method is proposed for controlling the inflow of an exhaust gas turbine of an exhaust gas turbocharger of a motor vehicle with a variable turbine geometry, wherein a fixed guide blade ring and an axially moveable control blade ring are employed with a definition of a size of inflow cross sections to the turbine wheel of the exhaust gas turbocharger through the setting of an axial relative position of the guide blades of the guide blade ring and the control blades of the control blade ring, wherein as a function of the axial relative position additional inflow paths are partially opened or closed to increase or reduce the inflow cross sections.

Further advantageous embodiments are obtained from the subclaims and combinations of these.

The invention is explained in more detail in the following by means of exemplary embodiments without being restricted to these however.

BRIEF DESCRIPTION OF THE DRAWINGS

It shows

FIG. 2.1 an axial section through the turbine;

FIG. 2.2 an axial section through the turbine with a one-piece guide blade ring with turbine housing;

FIGS. 3.1 to 3.3 the different positions of a control blade ring of the turbine with various inflow cross sections;

EMBODIMENT(S) OF THE INVENTION

Figure 1:
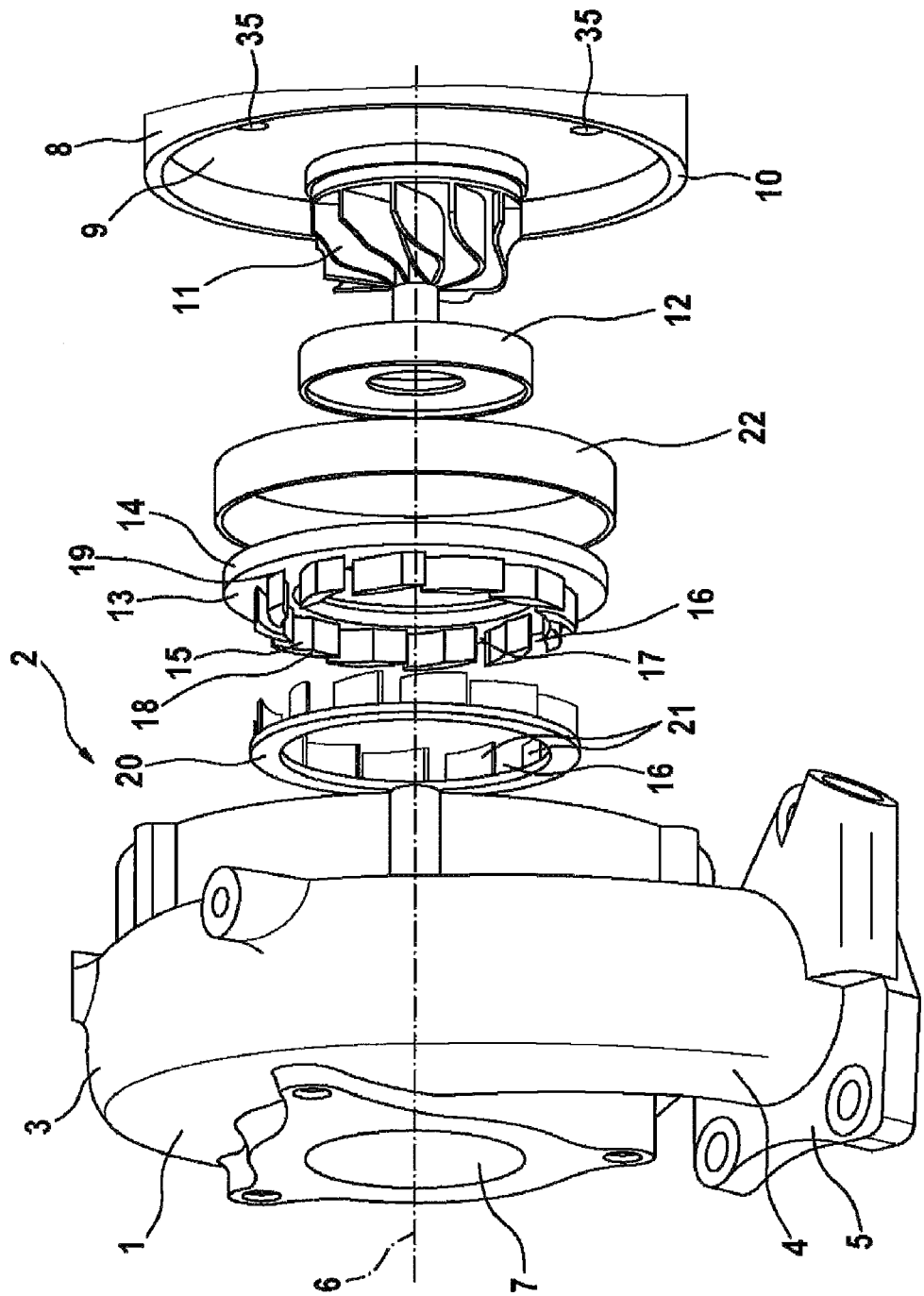
FIG. 1 in exploded view the components of a turbine according to the invention.

FIG. 1 shows a turbine 1 of an exhaust gas turbocharger 2 in exploded view, with a turbine housing 3 which, for supplying exhaust gas, comprises an exhaust gas feed 4 with a connection flange 5, wherein the exhaust gas feed 4 extends spiral-shaped about a turbine rotation axis 6 on the outer circumference side of the turbine housing 3, and with an outlet pipe 7 serving for the discharge of exhaust gas which is followed by an exhaust system for discharging and if applicable treating the exhaust gas which is not shown here. Introduced in the turbine housing 3 is a body group 8 having a floor plate 9 which rises on the outer circumference side ring-shaped in a support ring 10 and centrally through which a turbine shaft which is not shown here engages, on which shaft a turbine wheel 11 is arranged in a rotationally fixed manner. The turbine wheel 11 is axially spaced from the floor plate 9 through a sliding sleeve 12 through which the turbine shaft that is not shown engages. Mounted concentrically on the sliding sleeve 12 is a control blade ring 13 which comprises a control blade carrier 14 which engages ring-shaped about the sliding sleeve 12, from which carrier the control blades 15 axially project out in the direction facing away from the floor plate 9, wherein the control blades 15 between them comprise flow slots 16. The control blades 15 are arranged on the control blade carrier 14 in a fixed manner, i.e. not moveable relative to the control blade carrier. The control blades have three ends 18 each of which is located axially extended on each control blade 15 opposite a connection 19 to the control blade carrier. Arranged in axial, concentric position opposite the control blade ring 13 is a guide blade ring 20 comprising axially projecting guide blades 21 permanently connected with said guide blade ring, wherein between the guide blades 21 flow slots 16 for the passage of exhaust gas which is not shown are embodied and wherein the guide blades 15 engage in the flow slots 16 of the guide blade ring 20 and conversely the guide blades 21 in the flow slots 16 of the control blade ring 13. The guide blade ring 20 is mounted in the turbine housing 3 in a fixed manner, whereas the control blade ring 13 is guided axially moveable on the sliding sleeve 12 within the sleeve 22 surrounding it. It is consequently possible to narrow the flow slots 16 of the guide blade ring 20 to a greater or lesser degree through the control blades 15 of the control blade ring 13 which dip into these. Because of this inflow cross sections 17, which are present between the control blades 15, are narrowed. The floor plate 9 in preferred embodiments comprises pressure relief bores 35 through which it is ensured that the axial movement of the control blade ring 13 is not hindered at the front and back through different pressure conditions or is accelerated or decelerated in an undesirable manner. Through the pressure relief bores 35 the pressure conditions from the region of the exhaust in feed 4 can equalise with those in the region of the body group 8 via paths and openings arranged within the housing 3 in the region of the body group 8, so that the axial displacement of the control blade ring 13 on the sliding sleeve 12 is not decelerated or accelerated relative to the region of the body group 8 through excess pressure in the exhaust gas feed 4. The pressure relief bores 35 are preferably arranged so that these do not result in turbulences or undesirable swirling of the entering exhaust gas flow.

FIG. 2.1 illustrates the guide blade ring 20 as a separate piece from the turbine housing 3, while FIG. 2.2 illustrates the guide blade ring 20 as one piece with the turbine housing 3. Additionally, FIGS. 2.1 and 2.2 show an axial section at the height of the turbine rotation axis 6 through the turbine 1, with the turbine housing 3, which on the circumferential side brings about the exhaust gas feed 4 for the inflow of exhaust gas not shown to the turbine wheel 11 arranged centrally rotatable axially located opposite the outlet pipe 7, which is mounted in a rotationally fixed manner on the turbine shaft 25 and arranged in a rotatable manner in the turbine housing 3. Axially following the turbine wheel 11, located opposite the outlet pipe 7, is the sliding sleeve 12 which on a bearing group 23 is mounted preferably undisplaceably ring-shaped about a shaft bearing 24, wherein the bearing group 23 belongs to the body group 8, which more preferably comprises a control mimicry for the axial displacement of the control blade ring 13 mounted in an axially displaceable manner on the sliding sleeve 12. The sliding sleeve 12 simultaneously serves as heat shield 36 which shields the bearing group 23 from the heat development emanating from the hot inflowing exhaust gas and the turbine wheel 11. Preferably the sliding sleeve 12 is therefore not completely in contact with the bearing group 23; by creating air spaces 37 a direct heat transfer by way of solid-borne transfer is advantageously avoided. The control blade ring 13 in this case is mounted axially displaceably between the sliding sleeve 12 and the sleeve 22, wherein the control blades 15 with their free ends 18 strike the guide blade ring 20 whose guide blades 21 in their projecting orientation are exactly opposite to the control blades 15 and strike the control blade ring 13, namely the control blade carrier 14. The control blade ring 13 is axially displaceable on the sliding sleeve 12 as indicated by the arrow R. The axial movement is facilitated through the pressure equalization that takes place via the pressure relief bores 35. Downstream of the guide blades 21 the exhaust gas is conducted on to turbine blades 26 of the turbine wheel, wherein in axial extension of the region of each turbine blade 26 loaded by the exhaust gas, namely on the outermost circumference of the turbine wheel 11 of each turbine blade 26, a delivery edge 27 is formed in whose region, seen in axial extension, the exhaust gas strikes the turbine blade 26.

FIG. 3 shows a part FIG. 3.1 in sections the axial section from FIG. 2 in the region of the variable turbine geometry 28 formed of control blade ring 13 and guide blade ring 20, wherein exhaust gas W from the exhaust gas feed 4 is supplied to the turbine wheel 11 via the variable turbine geometry 28, wherein it strikes the delivery edge 27 of each turbine blade 26. Through the axial relative position of control blades 15 of the control blade ring 13 to the guide blades 21 of the guide blade ring 20 the size of the inflow cross section of the exhaust gas W to the turbine wheel 11 is defined. In completely opened position, i.e. when the control blades 15 and the guide blades 21 do not intermesh comb-like but are situated as far as possible apart, additional inflow paths 29 are opened between the sliding sleeve 12 and the sleeve 22 between which the control blade ring 13 is guided, so that the exhaust gas W reaches the turbine wheel 11 in the region of the delivery edge 27 of each turbine blade 26 even through the additional inflow paths 29.

Part FIG. 3.2 shows the variable turbine geometry 28 in a partially closed state, i.e. a state in which the inflow cross section is reduced, wherein the control blade ring 13 is axially moved further in the direction of the guide blade ring 20 and in that position control blades 15 and guide blades 21 partially intermesh comb-like. At the same time, through the axial displacement of the control blade ring 13 in the direction of the guide blade ring 20, the additional inflow paths 29 are partially closed so that the inflow cross section that is altogether available for the exhaust gas W is reduced. The delivery edge 27 of each turbine blade 26 however remains the same. This means that partial closing or closing of the inflow cross sections through the axial displacement of the control blade ring 15 in the direction of the guide blade ring 20 and intermeshing of control blades 15 and guide blades 20 do not lead to a change of the loading of the delivery edge 27, i.e. that more preferably the delivery edge 27 seen in axial extension is not embodied shorter when the variable turbine geometry 28 is closed to a greater or lesser degree.

Part FIG. 3.3. shows the variable turbine geometry 28 in the maximally closed state in which the control blades 15 are in contact with the guide blade ring 20, and conversely the guide blades 21 are in contact with the control blade carrier 14, the control blade ring 13. The additional inflow paths 29 are closed here so that the inflow cross-section ultimately available to the exhaust gas W has reached the smallest possible size. The delivery edge 27 however remains nevertheless axially extended identically to the positions described in part FIGS. 3.1 and 3.2 above. With assumed identical volumetric flow/pressure of the exhaust gas W a high inflow velocity v is obtained with the smallest inflow cross-section possible.

Figure 4:
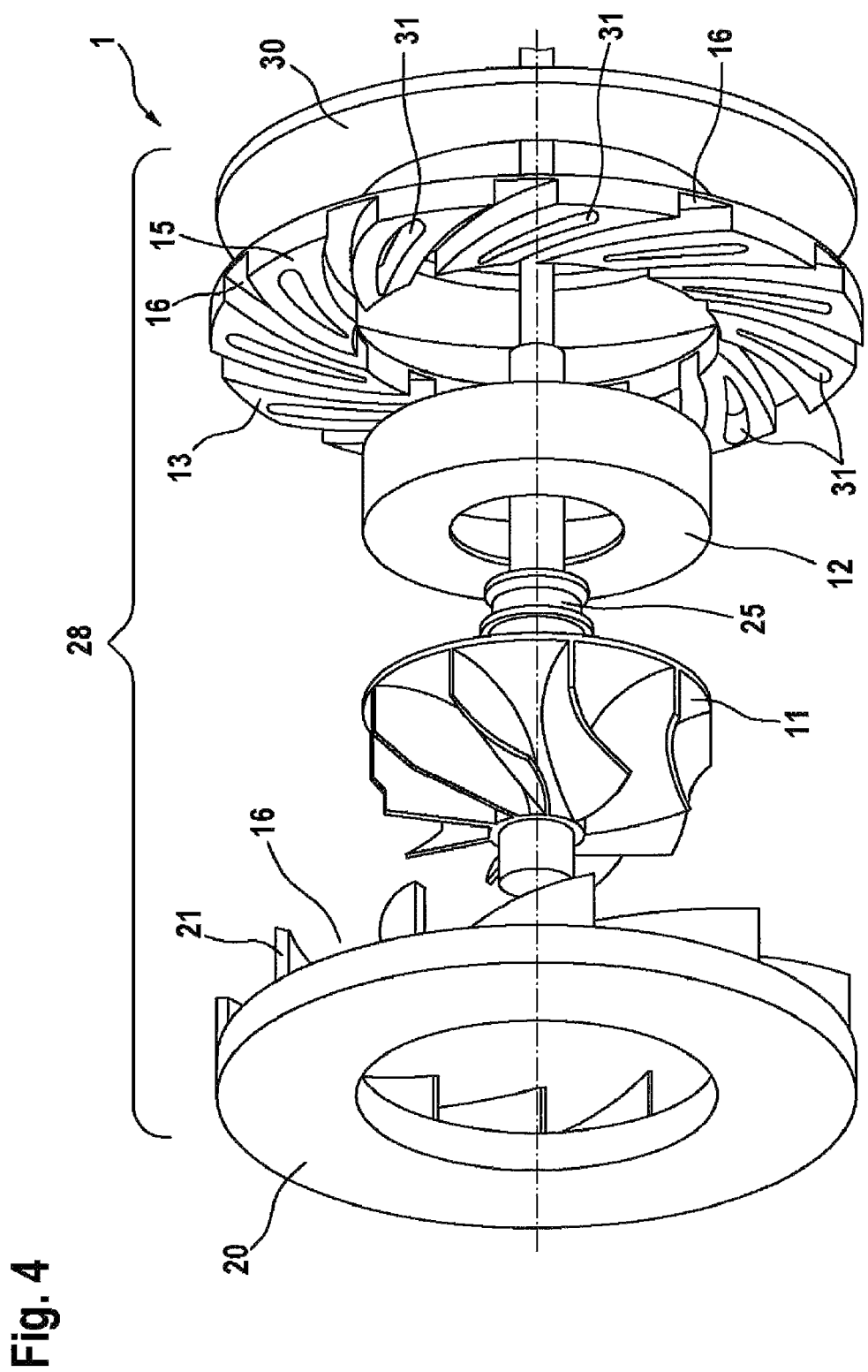
FIG. 4 an exploded view of components of another embodiment of the turbine.

FIG. 4 shows another embodiment of a variable turbine geometry 28 of a turbine 1. Here, concentrically about the turbine wheel 11, the guide blade ring 20 with guide blades 21 are arranged, wherein the guide blade ring 20 is mounted in a fixed manner in the turbine housing which is not shown here, its position relative to the turbine wheel 11, which is surrounded by it, is consequently unchangeable. The sliding sleeve 12 on which the control blade ring 13 is mounted in an axially displaceable manner is arranged engaging about the turbine shaft 25 ring-shaped, wherein the control blade ring at the bottom side, i.e. facing away from the guide blade ring 20, is loaded by a lid 30. The control blade ring 13 comprises control blades 15 which are embodied in a fixed manner, more preferably in one piece, on the control blade ring. The control blades 15 comprise depressions 31 which extend in their longitudinal direction and which are open in the direction of the guide blades 21, into which upon axial displacement of the control blade ring 30 on the sliding sleeve 12 the guide blades 21 at least in sections or entirely dip. Between the guide blades 21 flow slots 16 are embodied which come to be positioned opposite the flow slots 16 embodied between the control blades 15. The inflow cross section ultimately available for the exhaust gas is determined through the flow slots 16, which on the guide blade ring 20 are embodied with a significantly larger cross section than on the control blade ring 13.

Figure 5:
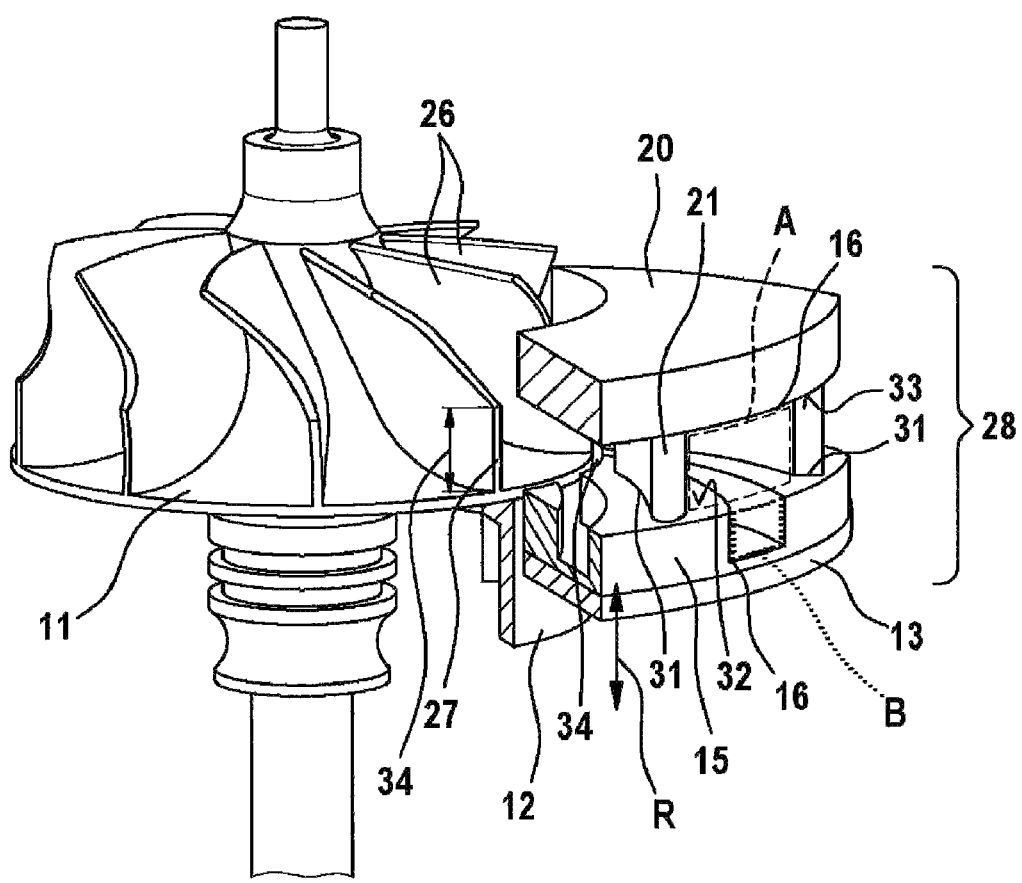
FIG. 5 a perspective view of this variable turbine geometry.

FIG. 5 shows the mode of operation of the variable turbine geometry 28 described above. The guide blade ring 20 is mounted, relative to the turbine wheel 11, unmoveably and in the region of its flow slots 16 exposes an inflow cross section to the delivery edges 27 of each turbine blade 26. The flow slots 16 of the control blade ring 13 in this case are entirely or at least partially ineffective since they are covered by the sliding sleeve 12 on which the control blade ring 13 is mounted in an axially displaceable manner. Effective therefore is the cross section which is obtained from a control blade upper edge 32, a guide blade ring lower side 33, which is located opposite the control blade upper edge 32 and on which the guide blades 21 are embodied, and the walls of the guide blades 21 which are located opposite one another, which is shown on the inflow side and designated A and drawn in a dashed line. If the control blade ring 13 is now moved in the direction of the arrow R axially in the direction of the guide blade ring 20 the guide blades 21 dip into the depressions 31 of the control blades 15 as a result of which the cross section A is increasingly reduced, since the control blade ring upper side 32 is guided closer to the guide blade ring lower side 33. To the same degree however as the cross section A is reduced, the cross section B, drawn in dotted line, is exposed on the turbine wheel side through the emerging of the control blade ring 13 over the sliding sleeve 12 which is obtained from the cross section of the flow slots 16 of the control blade ring 13. To the extent to which the cross section A between the guide blades 21 is thus closed, the cross section B between the guide blades 15 is opened in its place, since its outlet region 34 in the region of the turbine wheel 11 is no longer covered by the sliding sleeve 12, but is located freely opposite the turbine wheel 11. Through this it is achieved that the inflow of the turbine wheel 11 always takes place in the region of the delivery edge 27, wherein the arrangement of the guide blade ring 20 takes place in such a manner that with the position of the guide blade ring 20 and the control blade ring 13 located maximally apart, the inflow through the arrangement of the guide blades 21 of the guide blade ring 20 which rests in a fixed manner in the turbine housing which is not shown, always takes place in the region of the delivery edge 27. An axial displacement of the control blade ring 13 thus does not bring about any change of the axially extended inflow on to the delivery edges 27 in an axial cross section 34, but merely a change of the inflow cross sections to the turbine wheel 11 which is obtained from the cross sections A and B.

The invention claimed is:

1. A variable turbine geometry of an exhaust gas turbocharger of a motor vehicle, comprising:
   a turbine wheel of the exhaust gas turbocharger including inflow cross sections;
   a fixed guide blade ring including guide blades; and
   an axially moveable control blade ring including control blades and a cross carrier,
   wherein an axial relative position of guide blades of the guide blade ring in relation to the control blades of the control blade ring defines the size of inflow cross sections to the turbine wheel of the exhaust gas turbocharger, and
   wherein the guide blades and the control blades extend in opposite directions to one another as far as to their respective free ends and the control blades are arranged on the cross carrier of the control blade ring, which performs at least one of opening, partially opening and closing as a function of the axial relative position, additional inflow paths for the enlargement or the reduction of the inflow cross sections.

2. The variable turbine geometry according to claim 1, wherein the control blades and the guide blades intermesh in a comb-like configuration as at least one of a greater degree and a lesser degree as a function of their axial relative position.

3. The variable turbine geometry according to claim 1, wherein the control blade ring comprises depressions in which the guide blades of the guide blade ring engage as at least one of a greater degree and a lesser degree as a function of their axial relative position.

4. The variable turbine geometry according to claim 1, wherein the turbine wheel comprises turbine blades each with a delivery edge, wherein the delivery edges are subjected to inflow independent of the relative position of the guide blades and the control blades relative to each other by a generally constant axial cross section.

5. The variable turbine geometry according to claim 1, wherein the cross carrier has a ring structure which is mounted axially displaceably in a ring channel of a housing of the exhaust gas turbocharger.

6. The variable turbine geometry according to claim 1, wherein the guide blade ring at least in sections is created in one piece with the turbine housing.

7. A method for the control of the inflow of an exhaust gas turbine of an exhaust gas turbocharger of a motor vehicle, with a variable turbine geometry, comprising the steps of:
   employing a fixed guide blade ring and an axially moveable control blade ring;
   defining of a quantity of inflow cross sections to a turbine wheel of the exhaust gas turbocharger through the setting of an axial relative position of the guide blades of the guide blade ring and control blades of the control blade ring, wherein the control blade ring comprises depressions in which the guide blades of the guide blade ring engage as at least one of a greater degree and a lesser degree as a function of their axial relative position, and
   opening additional inflow paths as a function of the axial relative position, wherein the additional inflow paths are at least one of partially opened to enlarge and closed to reduce the inflow cross sections.

8. An exhaust gas turbocharger including variable turbine geometry, comprising:
   a turbine wheel of the exhaust gas turbocharger including inflow cross sections;
   a fixed guide blade ring including guide blades; and
   an axially moveable control blade ring including control blades and a cross carrier,
   wherein an axial relative position of guide blades of the guide blade ring in relation to the control blades of the control blade ring defines the size of inflow cross sections to the turbine wheel of the exhaust gas turbocharger, and
   wherein the guide blades and the control blades extend in opposite directions to one another as far as to their respective free ends and the control blades are arranged on the cross carrier of the control blade ring, which performs at least one of opening, partially opening and closing as a function of the axial relative position, additional inflow paths for the enlargement or the reduction of the inflow cross sections.

* * * * *